N. Whitehall.
Corn Planter.
Nº 94,365.   Patented Aug. 31, 1869.
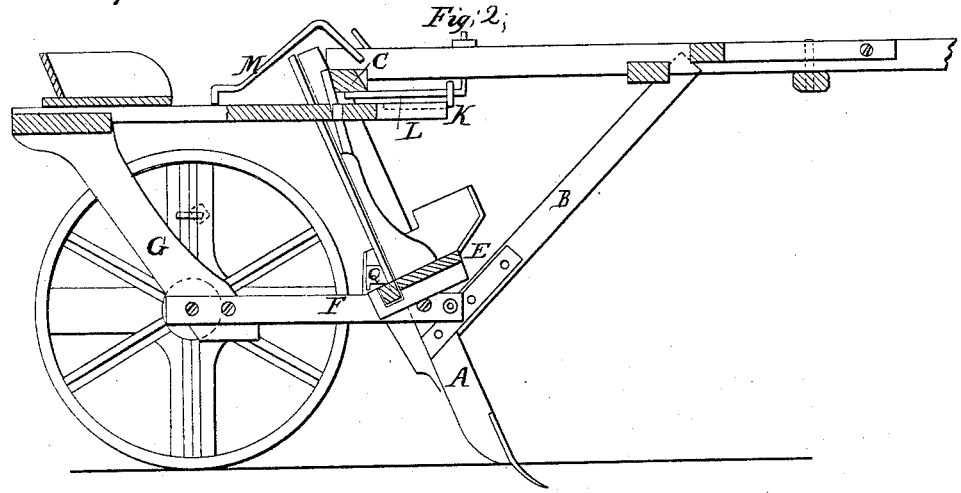
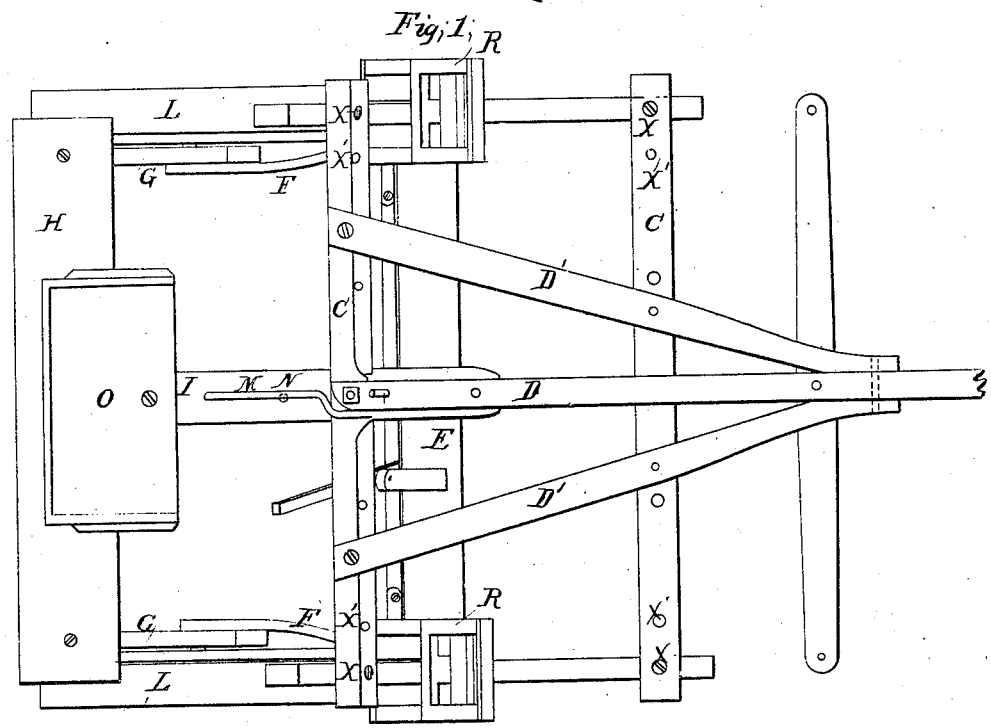
Witnesses;
O. Hinchman
Jno. H. N. Brooks
Inventor;
N. Whitehall
Attorneys.

United States Patent Office.

NICHOLAS WHITEHALL, OF NEWTOWN, INDIANA.

Letters Patent No. 94,365, dated August 31, 1869.

IMPROVEMENT IN PLANTER AND CULTIVATOR.

The Schedule referred to in these Letters Patent and making part of the same.

*To all whom it may concern:*

Be it known that I, NICHOLAS WHITEHALL, of Newtown, in the county of Fountain, and State of Indiana, have invented a new and improved Planting and Cultivating-Machine; and I do hereby declare that the following is a full, clear, and exact description thereof, which will enable others skilled in the art to make and use the same, reference being had to the accompanying drawings, forming part of this specification.

The object of this invention is to provide a machine capable of planting and cultivating corn, or other grain planted in a similar way, which may be readily adjusted to the condition of a planter or cultivator.

Figure 1 represents a plan view of my improved machine, when adjusted for planting;

Figure 2 represents a sectional elevation of the same;

Figure 3 represents a rear view, partly in section, and partly in elevation; and Figure 4 represents a plan view when adjusted for cultivating.

Similar letters of reference indicate corresponding parts.

The plow-stocks A, having braces B, are detachably connected to the transverse bars C C, permanently connected to the tongue D, and hounds D', as shown in fig. 1.

Two of these plows are used for planting, and they support, near the junction of the stocks with the braces, a transverse hopper and hopper-slide support, E.

They are also detachably connected at about the same point to connecting-bars, F, so as to oscillate, to some extent, vertically on the said connection.

These connecting-bars are connected rigidly to the side-pieces G of a truck, near the axles of the same, which are short studs projecting from one side of the said side-pieces.

These side-pieces support a transverse seat-bar, H, having a tongue, I, projecting forward under the rear cross-piece C, and connected by an eye, K, to a long link, L, suspended from the tongue D, so as to slide longitudinally thereon.

M represents a latch, pivoted to the tongue, and adjusted relatively to the tongue I, so that its free end will fall into holes, N, arranged in a row along the said tongue I.

As the plows are thus supported at the rear on the axle, and at the front by the end of the tongue D, in the harness of the animals, any adjustment of this tongue I, to or from the rear cross-piece C, will affect the height of the plows, the adjustment forward lowering them, and the adjustment rearward raising them. They may, by this arrangement, be raised entirely out of the ground.

The operator sitting on the seat O, and resting his feet on a cord, by which he operates the valve-slide, or on stirrups, for guiding the plows, as will be hereinafter described, may so balance himself on the machine as by his weight to make these adjustments, the catch M being raised out of the holes, and allowed to drop in, when they coincide.

These adjustments apply to the machine either when used as a planter or cultivator.

The hopper and valve-support E, is applied so as to be readily detached when the machine is to be adjusted for cultivating.

For this purpose it is provided with transverse slots to match the stocks A, of the plows, of the same depth as the breadth of the said stocks, as shown in plan view in fig. 1, and section, fig. 2, so that it will engage the said stocks by sliding the latter into the notches or slots.

When so engaged, it is secured by blocks Q, passing behind the plow-stocks, and metal binding-straps, screwed on so as to be readily removed.

These blocks Q also form the bottom of the seed-boxes R, which are placed on the support E, adjacent to the stocks A, and so arranged as to deliver the seed each side of the said stocks to the passages in the said blocks Q, wherein slide-valves, S, connected to a sliding bar, T, work to regulate the delivery of the seed.

This slide may be operated by a hand-lever, U, within reach of an operator sitting on the seat, or a cord working over pulleys, and so adjusted that the operator may work it by his feet back and forth, may be used.

The slide-valves are detachably connected to the slide T, for ready removal when the machine is adjusted for cultivating.

They must be so removed in order to permit the withdrawal of the seed-box support, as they work behind the stocks A.

For planting, I employ broad auxiliary wheels, V, for running along over the furrow in which the seed is dropped, for filling and pressing the soil down upon the seed.

These auxiliary wheels are secured on hubs, W, of the smaller wheels G', seen in fig. 4, which project outward when they receive the said auxiliary wheels.

When the machine is to be employed for cultivating, the seed-box support E is removed, in the manner above described. The end-supports G, of the truck are changed in position by detaching them from the ends of the transverse plate H, and securing them to the opposite ends, so that the axles will project inward. The connecting-bars F are also similarly changed, and the plows A are changed from their connection with the bars C, from the outermost conlecting-holes X, as shown in fig. 1, to the inner connecting screw-holes X', as shown in fig. 4, and other plows, A', are interposed between the outer ones, connected by screws or bolts to the rear cross-piece, and by hooks, B', from the front.

These inner plows are designed to be moved laterally while working them, for guiding them along rows, or to avoid obstructions, and for this purpose a yoke, C', is suspended from the tongue D, near the rear crosspiece C, so as to vibrate freely thereon, with the lower ends pivoted to the stocks of the plows at E', and connected by rods, F', to the vibrating bars G', carrying foot-treadles, H. By these treadles, the operator, with his feet, is able to guide said plows as he desires.

The connecting-bars F are placed on the outside of the end-supports G, of the truck, and the plow-shanks, instead of on the inside, as in the planting-adjustment, and the broad auxiliary wheels V are dispensed with.

The object of this adjustment of the plows A, is to bring them to the distance apart required for cultivating, which is different from that required when planting, and the adjustment of the wheels is to bring them into line with the furrows, to run therein.

Having thus described my invention,
I claim as new, and desire to secure by Letters Patent—

1. The arrangement of truck-connecting bars F, plow-stocks A, tongue I, and latch M, substantially as specified.

2. The arrangement of the connecting-bars F, side-supports G, and short axles for reversing their positions, and the positions of the wheels, substantially as specified.

3. The detachable seed-box and slide-support E, plow-stocks A, blocks Q, and valve-slide, all combined and arranged substantially as specified.

4. The vibrating plows A', yoke O', treadles H, rods F', and vibrating levers, all arranged substantially as specified.

5. The combination, with the narrow wheels G, of the broad wheels N, when arranged and applied substantially as specified.

NICHOLAS WHITEHALL.

Witnesses:
ELIJAH E. COOPER,
DAVID BALCH.